United States Patent [19]

Watson

[11] Patent Number: 5,044,404

[45] Date of Patent: Sep. 3, 1991

[54] VACUUM AND CONTROL SYSTEM SEALING CAPS AND PLUGS

[76] Inventor: Roy L. Watson, 2131 Stallings St., NW., Covington, Ga. 30209

[21] Appl. No.: 90,096

[22] Filed: Aug. 27, 1987

[51] Int. Cl.$^5$ .............................................. F16L 57/00
[52] U.S. Cl. .................................... 138/89; 138/96 R; 138/96 T; 138/104
[58] Field of Search ...................... 138/96 R, 96 T, 89, 138/104; 33/178 B, 501, 501.45; 220/DIG. 19; 40/913

[56] References Cited

U.S. PATENT DOCUMENTS 2,321,667  6/1943  Foster .......................... 220/DIG. 19
2,454,555  11/1948  Henderson et al. ................... 138/89
3,574,312  4/1971  Miller ................................ 138/96 R

OTHER PUBLICATIONS

G.E. Technical Report, 6/47, G.E. Sealing Caps & Sleeves for Pipes, etc.

Primary Examiner—Harry N. Haroian
Attorney, Agent, or Firm—James A. Hinkle

[57] ABSTRACT

A device consisting of a plug and cap which provides a means of sealing, accounting for, and correct replacement of lines and fittings on the internal combustion engines and their associated components and controls removed, or separated during maintenance and testing.

6 Claims, 1 Drawing Sheet

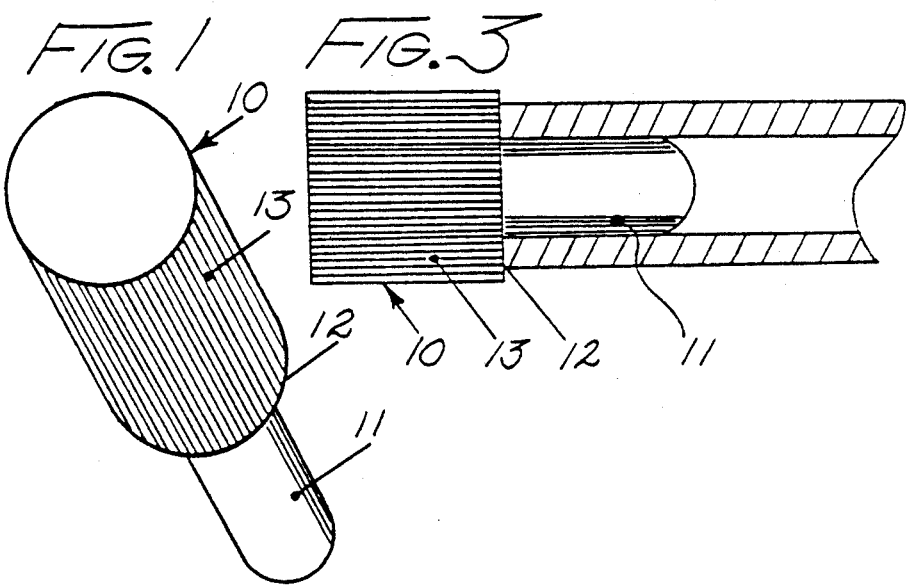
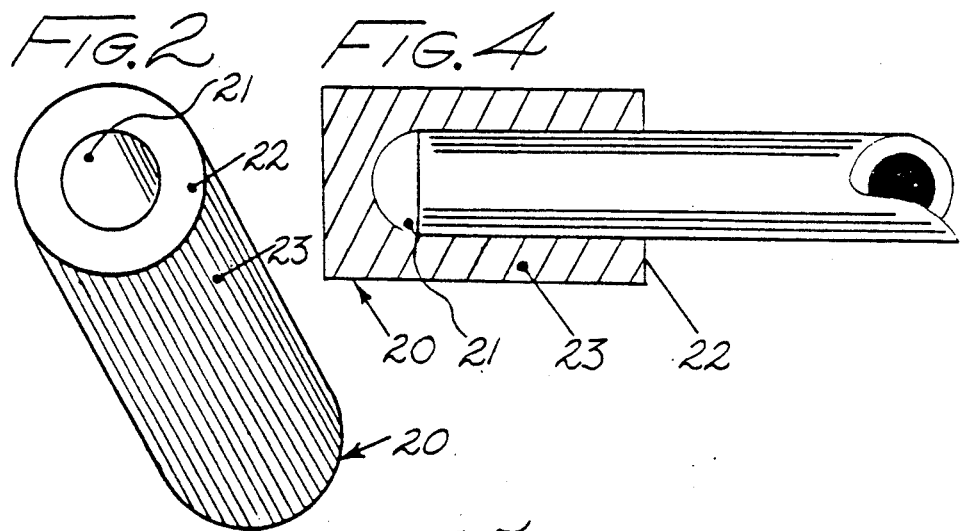
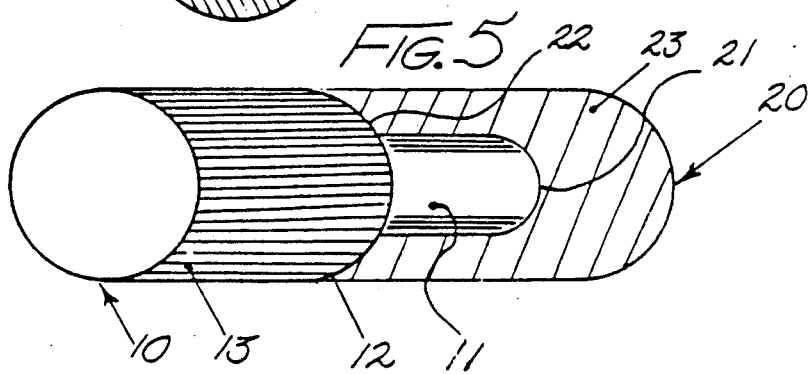

VACUUM AND CONTROL SYSTEM SEALING CAPS AND PLUGS

BACKGROUND

1. Field of the Invention

A resilient cap and rigid plug combination in various matching colors and sizes to be used to seal, account for, and properly relocate vacuum, and control lines, and fittings on internal combustion engines, and their associated components, and controls during maintenance and testing procedures.

2. Description of Prior Art

No device or system existed prior to this invention for sealing, accounting for, and relocating correct replacement position of vacuum, and control system lines associated with internal combustion engines and related controls, and systems which were disconnected, or removed during maintenance, and testing. Thus, the personnel performing maintenance, or tests on these systems have had to rely on anything at hand to seal lines and fittings so removed, and must rely on memory and vacuum diagrams when replacing and reconnecting these lines and fittings following tests and maintenance, this device solves this problem and when properly utilized insures a desired seal of components as well as complete and correct reconnection of those components.

SUMMARY OF THE INVENTION

The device consists of a rigid plug and pliable cap which are matched, and paired by size and color.

The plugs and caps come in a variety of sizes and colors. The sizes are determined by the requirements of the lines and fittings to be sealed.

Each size cap and plug combination comes in numerous matched colors so that many lines and fittings of the same size may be sealed without confusing which line and fitting should be reconnected to each other at time of replacement.

The caps and plugs provide an air tight seal for vacuum and control lines which are removed from internal combustion engines and their associated components and provide a positive system by which the proper line can be mated to the correct fitting during the replacement process by matching size and color caps to corresponding size and color plugs.

The caps and plugs also provide a means of accounting for the total number of lines and fittings removed and sealed, in that if the number of plugs and caps used to seal them is known, then that same number must be retrieved thus, insuring all lines and fittings which were disconnected will be replaced; and that by matching size and color to corresponding size and color they will be returned to their original and correct positions thus eliminating the possibility of error and greatly reducing the time span required to perform the process correctly.

BRIEF DESCRIPTION OF DRAWING

FIG. 1 is a perspective view of the rigid male plug.
FIG. 2 is a perspective view of the pliable female cap.
FIG. 3 is a longitudinal cross section of the subject plug disposed within the interior of a tubular member.
FIG. 4 is a longitudinal cross section of the subject cap encompassing the exterior of a tubular member.
FIG. 5 is a longitudinal view of the plug and a cross section of the cap in their stored position.

DESCRIPTION OF THE PREFERRED EMBODIMENT

The plug 10 is preferably constructed of a rigid plastic compound. Other materials can be used provided they be heat, petroleum and chemical resistant and provide an adequate seal. The plug is constructed of a cylindrical body member 13 which has a concentrically positioned male cylindrical plug 11 extending away from the body member 13. The smaller diameter of the plug defines a shoulder 12 at the intersection of the body 10 and the plug 11 which shoulder will abut the endmost edge of the line or tube when inserted.

The cap 20 is preferably constructed of a resilient plastic compound. Other materials can be used provided they be heat, petroleum and chemical resistant and provide an adequate seal.

The cap 20 is constructed of a cylindrical body member 23 which has a concentrically located longitudinal bore 21. The back plate 22 is circularly shaped and is situated to have the same centerline axis of the cylinder 23 and the bore 21. The concave end of the bore 21 forms a tapered stop to about the endmost edge of the fitting or tube when installed. Plugs 10 and Caps 20 both male and female have colors, diameters and lengths defined within specified ranges and tolerances.

Thus the colors and dimensions of the invention may be varied from those given below without departing from the scope or application of the invention.

These plugs 10 and caps 20 can be injection molded as a single piece of plastic compound.

The cylindrical body member 13 of the male plug has an outside diameter of 0.500 inches and a length of 0.500 inches. The cylindrical plug portion 11 of the plug unit 10 is 0.500 inches in length and presently available in the following diameters 0.125 inches, 0.1875 inches, 0.250 inches and 0.3125 inches. The shoulder 12 formed by the plug 11 in relation to the body 13 has the following widths in direct relation to the plug 11 diameters which form them.

The shoulder 12 widths at present are as follows 0.1875 inches, 0.1562 inches, 0.1250 inches and 0.0962 inches.

The cylindrical caps 20 have an outside diameter of 0.500 inches and a body 23 length of 0.750 inches. The bore 21 of the cap 20 extends for a depth of 0.625 inches into the body member 23 of the cap 20 thus leaving a solid end portion 0.125 inches thick at the end of the cap 20 as a seal.

The cylindrical bores 21 of the cap 20 are currently available in the following diameters. 0.120 inches, 0.1825 inches, 0.245 inches and 0.3075 inches.

The back plate 22 formed by the relation of the bore 21 to the body member 23 are in direct relation to the bore diameters which form them and they are presently in the following widths. 0.1900 inches, 0.1587 inches, 0.1275 inches, and 0.0962 inches.

The combined stored length of the plug 10, and the cap 20 is 1.250 inches with a uniform outside diameter of 0.500 inches.

Colors currently in use for the plug 10 and corresponding caps 20 are red, white, blue, yellow, and green.

Plugs 10 are of a rigid plastic compound and are used to seal lines or tubes on internal combustion engines, and associated components and controls which disconnected, or removed for maintenance, or test procedures as well as affording a system for accounting for, and correctly reconnecting these components during reassembly.

Caps 20 are of a resilient plastic compound and are used to seal fittings and tubes on internal combustion engines from which lines are removed or disconnected during maintenance or testing procedures.

They also allow for a system of accounting for, and correctly relocating the correct line with the proper fitting at the time of reassembly by matching color, and size plug 10 with corresponding color and size cap 20.

I claim:

1. A color-coded closure system for sealing and identifying fluid lines wherein the closure system comprises;

a fluid line enclosure plug have a cylindrical configuration with a proximal end and a distal end, the proximal end of the plug having a substantially greater diameter than the distal end of the plug, the proximal end of the plug and the distal end of the plug having a juncture point defining a shoulder portion, a fluid line closure cap having a uniform cylindrical configuration with a proximal end and a distal end, the proximal end of the cap being closed, the distal end of the cap having an aperture therein, said aperture extending along the longitudinal center line of the closure cap to a predetermined distance short of the proximal end of the cap, the distal end of the plug adapted to be matingly engaged with the aperture of the cap for storage purposes, the plug and the cap being color coordinated in predetermined colors.

2. A color-coded closure system for sealing and identifying fluid lines as claimed in claim 1 wherein the closure plug and closure cap are colored red.

3. A color-coded closure system for sealing and identifying fluid lines as claimed in claim 1 wherein the closure plug and closure cap are colored white.

4. A color-coded closure system for sealing and identifying fluid lines as claimed in claim 1 wherein the closure plug and closure cap are colored blue.

5. A color-coded closure system for sealing and identifying fluid lines as claimed in claim 1 wherein the closure plug and closure cap are colored yellow.

6. A color-coded closure system for sealing and identifying fluid lines as claimed in claim 1 wherein the closure plug and closure cap are colored green.

* * * * *